United States Patent

[11] 3,595,283

| [72] | Inventors | Richard T. Cornelius<br>Minneapolis;<br>Irving Snyder, Anoka, both of, Minn. |
|---|---|---|
| [21] | Appl. No. | 732,489 |
| [22] | Filed | May 15, 1968 |
| [45] | Patented | July 27, 1971 |
| [73] | Assignee | The Cornelius Company<br>Anoka, Minn. |

[54] BEVERAGE MIXING AND DISPENSING MACHINE
17 Claims, 5 Drawing Figs.

[52] U.S. Cl. .................................................. 141/174, 222/129
[51] Int. Cl. ................................................... B65b 3/04, B67d 5/56
[50] Field of Search .......................................... 141/174, 107; 222/129; 221/96

[56] References Cited
UNITED STATES PATENTS

| 1,882,812 | 10/1932 | Gunn | 141/174 |
| 2,321,844 | 6/1943 | Nicholson | 141/174 X |
| 2,391,003 | 12/1945 | Bowman | 141/174 X |
| 2,591,507 | 4/1952 | Brous | 141/174 |
| 2,811,993 | 11/1957 | Ferdon | 141/174 X |
| 2,830,627 | 4/1958 | Polsen | 141/174 |
| 3,364,959 | 1/1968 | Herman | 141/174 X |
| 2,802,599 | 8/1957 | Callahan | 222/148 X |

FOREIGN PATENTS

| 807,031 | 1/1959 | Great Britain | 141/174 |

Primary Examiner—Herbert F. Ross
Attorney—Hill, Sherman, Meroni, Gross & Simpson ABSTRACT: A method and apparatus for mixing and dispensing a beverage including the step of and means for discharging a liquid beverage ingredient through a downwardly sloping outlet into a cup to produce swirling therein, the step of and means for directing a second beverage ingredient downwardly onto the swirling first beverage ingredient beginning after a substantial amount of the first beverage ingredient has been dispensed and caused to swirl, cup-guide means for directing a cup to a predetermined position to receive such beverage ingredients, such guide-means including a movable portion secured to a movable access door on the dispensing machine cabinet, and there being cup-supporting means adjacent to such movable door within the cabinet.

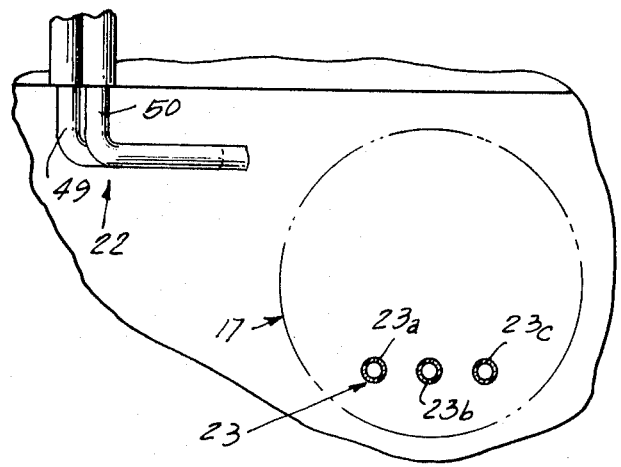
Fig. 3
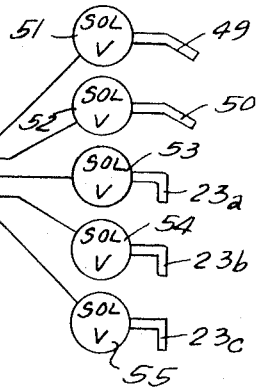
Fig. 5
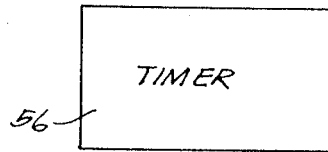
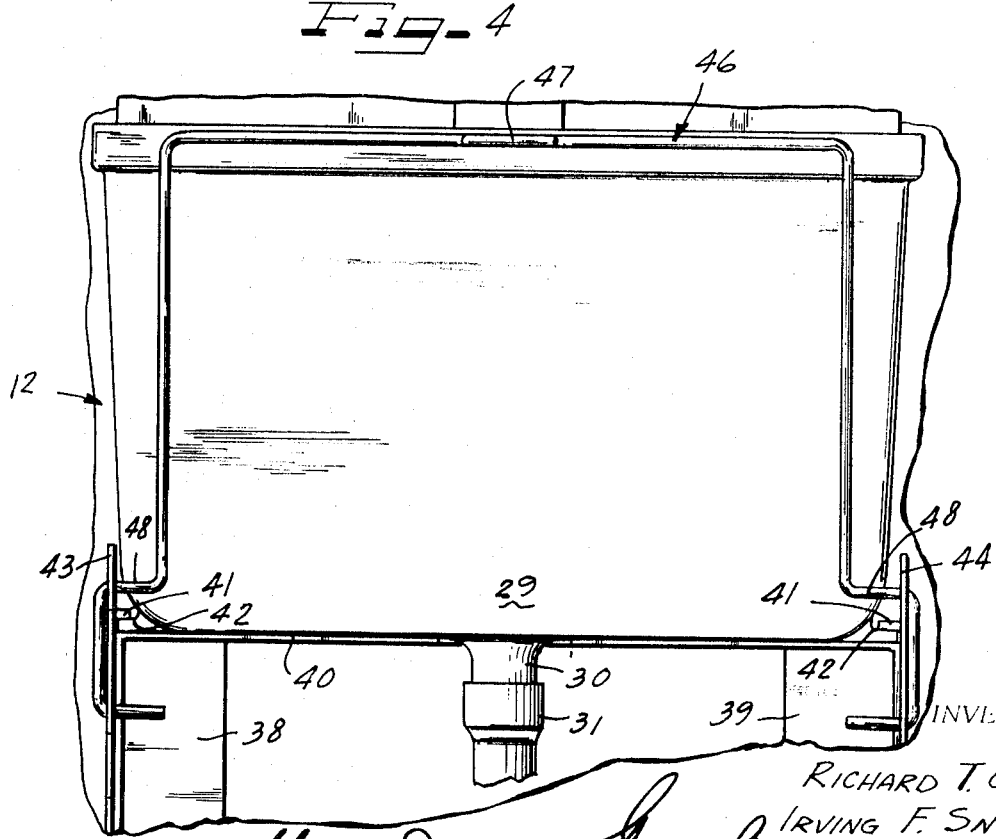
Fig. 4
INVENTORS
RICHARD T. CORNELIUS
IRVING F. SNYDER
BY Hill, Sherman, Meroni, Gross & Simpson
ATTORNEYS 3,595,283

BEVERAGE MIXING AND DISPENSING MACHINE

This invention relates generally to dispensing, and more specifically to a method and apparatus for mixing and dispensing a beverage in a serving cup.

Prior beverage mixing and dispensing methods and devices have been characterized by a great deal of complexity in structure, and in operation have produced nonuniform mixing, excessive foaming or decarbonation, dripping of syrup onto the cup-supporting means after a filled cup had begun to be removed and thereby creating an unsanitary condition, and cocking of vended cups.

In accordance with the present invention, we greatly simplify the structure that is needed and assure thorough uniform mixing while minimizing foaming by directing a stream of pressurized liquid beverage ingredient in a sloping manner into a cup at a point radially remote from the centerline of the cup to produce swirling of such beverage ingredient in the cup, and thereafter, at least after a substantial amount of such first ingredient has been dispensed, a second beverage ingredient is directed downwardly into the cup adjacent to its edge for being discharged onto the swirling first beverage ingredient. The second ingredient is discharged into the cup near the front side thereof, and a cup-guide includes a movable portion carried by an access door on the cabinet of the mixing and dispensing machine.

Accordingly, it is an object of the present invention to provide a beverage mixing and dispensing machine of the cup-vending type characterized by its simplicity of construction.

Another object of the present invention is to provide a method of and means for mixing and dispensing a beverage wherein foaming is minimized and wherein mixing is uniform.

A still further object of the present invention is to provide a beverage dispensing machine so constructed that it will inherently lessen the likelihood of its becoming unsanitary in the cup-filling area.

A still further object of the present invention is to provide a beverage dispensing machine of the cup type wherein the likelihood of a vended cup's becoming cocked is eliminated.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

ON THE DRAWINGS

FIG. 3 is a top view of the structure shown in FIG. 2 but presented in diagrammatic form;

FIG. 4 is a rear view of a portion of the structure shown in FIG. 2; and

FIG. 5 is a simplified diagrammatic representation of a portion of the control circuit of the beverage mixing and dispensing machine.

AS SHOWN ON THE DRAWINGS

Figure 1:
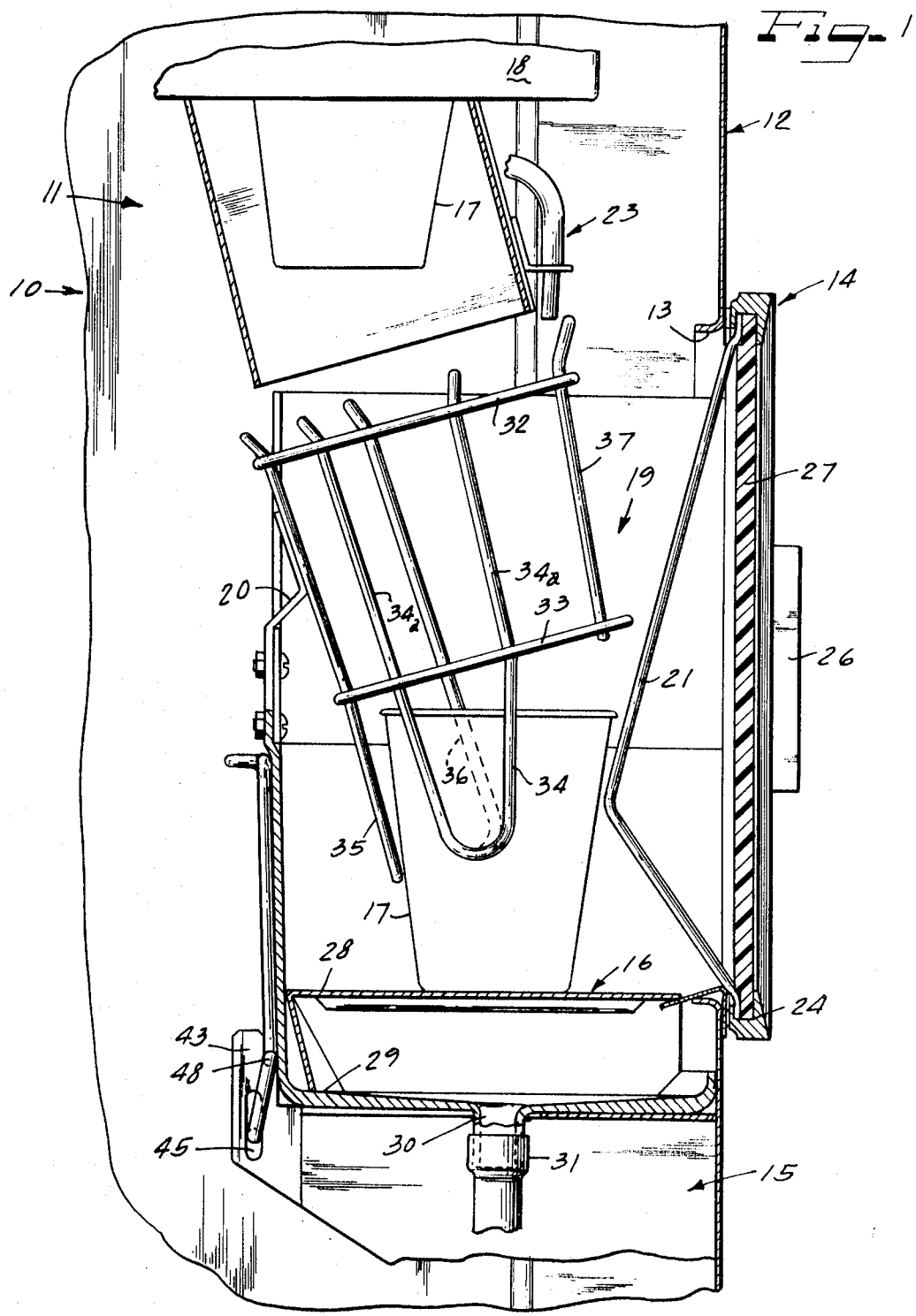
FIG. 1 is a side elevational view, partly in cross section, showing a novel portion of a beverage mixing and dispensing machine constructed in accordance with the principles of the present invention.

The principles of this invention are particularly useful when embodied in a beverage mixing and dispensing machine having a portion generally indicated by the numeral 10 on the drawings. The beverage mixing and dispensing machine 10 includes certain conventional components which are not illustrated including a supply of pressurized refrigerated carbonated water, a supply of pressurized refrigerated noncarbonated water, and three supplies of beverage mix, base or syrup. Also, a preferred embodiment would include conventional coin-controlled mechanism and circuitry, none of which is essential to a full understanding of the present invention. The beverage mixing and dispensing machine 10 includes a cabinet 11 having an open side which is closed by a main door 12 which is normally locked, the main door 12 having an aperture 13 which is normally closed by a movable door 14. Adjacent to the aperture 13, the main door 12 supports a bracket means 15 on which there is carried a cup-supporting means 16 for supporting a cup 17 in a predetermined position. A cup-vending means 18 of conventional configuration is disposed above the cup-supporting means 16, and extending therebetween, there is a cup guide 19 having a fixed portion 20 secured to the cup-supporting means 16 and a movable portion 21 secured to the movable door 14. A conduit means 22 (FIGS. 2 and 3) is supported on a fixed part of the machine within the cabinet 11 such that it does not show in FIG. 1 because of where the subject matter has been sectioned, and further means 23, for example also of a conduit type, are likewise supported by a stationary portion of the machine 10 within the cabinet 11.

Figure 2:
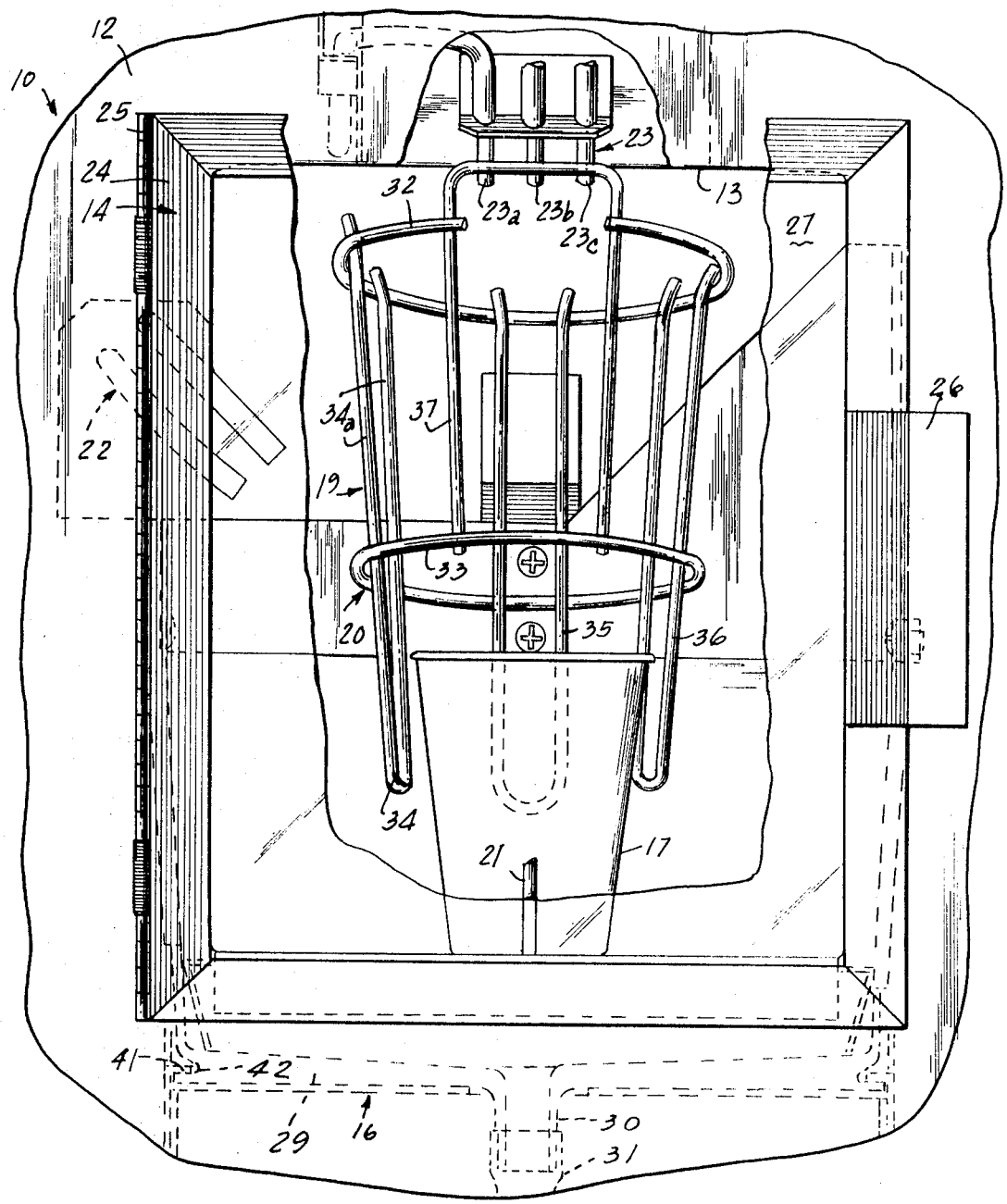
FIG. 2 is a front elevational view, partially broken away, of the structure shown in FIG. 1.

As best seen in FIG. 2, the movable door 14 includes a peripheral frame 24 having at one side a hinge 25 and at the opposite side a handle 26. For convenience in viewing and for facilitating sanitation, the door 14 further includes a transparent panel 27.

The cup-supporting means 16 includes a slotted grille 28 disposed in a drip tray 29 which is fitted with a drain 30 and a drain hose 31.

The predetermined position at which the cup 17 is held is determined by the guide 19. The fixed portion 20 of the guide 19 includes a pair of parallel wire loops 32, 33 on the inside of which there is disposed four U-shaped members 34—37. A major part of the lengths of the U-shaped members 34—37 are thus jointly arranged to encircle the path through which the cup 17 is dropped by the cup-vending means 18, the same being so arranged that the cup 17 drops substantially perpendicularly from the cup-vending means 18 to the predetermined ultimate position on the cup-supporting means 16. Such predetermined position is actually defined by the lower ends of the U-shaped members 34—36 and the movable portion 21 of the guide 19. The movable portion 21 in this embodiment is in the nature of a wire, flattened at its ends, the ends being trapped centrally of the movable door 14 between its peripheral frame 25 and the transparent panel 27. The legs of the U-shaped member 34 are rather far apart as seen at 34a, 34a in FIG. 1 for a purpose explained below while the U-shaped member 37 is inverted as shown best in FIG. 2 for two purposes explained below. FIG. 1 shows the arrangement of the guide during cup vending and filling, and when the movable door 14 is swung away, the movable portion moves to a remote position, thereby freeing or releasing the cup and rendering the same accessible for grasping as is readily apparent from the illustration of FIG. 2. The arrangement of the movable portion 21 in its closed position enables it to serve to assist in camming the cup to the predetermined filling position.

The bracket means 15 comprises a pair of laterally spaced brackets 38, 39 joined together by a shelf 40 having a slot therein for removably accommodating the drain 30. At each lateral end of the shelf 40, there is an upwardly and centrally extending flange 41 which is received in a front-to-rearwardly extending groove 42 provided at each of the oppositely laterally directed sides of the drip tray 29. Thus, by such structure, the drip tray 29 is disposed and supported adjacent to the aperture 13 in a manner that enables it to slide forwardly and rearwardly in a horizontal manner while being guided so that the same cannot move horizontally at right angles to such sliding movement or vertically. Immediately rearwardly of the drip tray 29, but at opposite sides thereof, each of the brackets 38, 39 is provided with an upstanding portion 43, 44 which has a surface directed toward the main door 12 or front of the machine and spaced therefrom. Each of the upstanding portions 43, 44 has a vertical slot 45, here generally parallel to the forwardly facing edges of the upstanding portions 43, 44. A wire bail 46, best seen in FIG. 4, has a central eyelet or grasping portion 47, the bail 46 extending horizontally from the grasping portion 47 to the left and the right, thence downwardly to provide a large U-shaped portion at the rear side of the drip tray 29. The lower end of the U-shaped portion terminates in a pair of horizontally directed portions 48, the outer ends of which extend downwardly and which have inturned ends reaching into the vertical slots 45. The horizontal bail portions 48 normally extend between the upstanding bracket portions 43, 44 and the drip tray 29 to preclude pivotally of the bail 46 within the slots 45. By grasping the eyelet 47, the bail 46 may be lifted so that the horizontal bail portions 47 clear the upper ends of the bracket portions 43, 44. The length of the slots 45 enables the inturned ends of the bail 46 to move upwardly, thereby enabling the horizontal bail portions 48 to pass above and over the portions 43, 44 of the brackets 38, 39 and hence rearwardly to a downwardly hanging position of temporary storage, thereby enabling removal of the drip tray 29 for service. The parts thus fit together by virtue of their configurations and no tool is needed to install or remove these components. The bail 46 and coacting parts 43, 45 of the bracket means 15 jointly comprise a locking member for the drip tray 29.

The conduit means 22 in this embodiment comprises a pair of conduits 49, 50 which are respectively connected to pressurized supplies of a first liquid beverage ingredient, each being connected to a different type of such ingredient. Carbonated water and noncarbonated water are typical examples of such two types of liquid beverage ingredient. The conduits 49, 50 terminate in outlets that slope such as shown in FIG. 2 and FIG. 3 so that the discharge of liquid ingredient is directed both downwardly and horizontally. As drawn, this angle is about 40° and would ordinarily fall in the range between 30° and 50° downwardly from the horizontal. The stream that is discharged from the outlets of the conduits 49, 50 is directed at a point within the cup 17 which point is radially remote from the vertical centerline of the cup. With the beverage ingredient so directed, once it is received by the cup, it will swirl about the periphery, move downwardly, and keep on swirling, at least for a number of seconds even after the discharge is terminated.

The further means 23 here comprises conduits, there being three such conduits in this embodiment each connected to a second beverage ingredient. Where three such further means are provided, it is contemplated that three types of second beverage ingredient would be provided. The outlet of the means 23 is fixedly directed downwardly into the cup 17 adjacent to an edge thereof, the edge referred to being that edge nearest the door aperture 13, as best seen in FIG. 1. The second beverage ingredient which is discharged through one of the outlets of the further means 23 discharges onto the swirling first beverage ingredient.

To carry out the foregoing automatically, there is provided an electric solenoid valve 51, 52 for the conduit outlets 49, 50, and a solenoid valve 53—55 respectively for each of the outlets 23a—23c. A timer 56 provides the proper sequencing and energizes one of the valves 51, 52 and controls it for regulating flow through each of the outlets 49, 50. The timer 56 initiates flow through one of the outlets 23 while a substantial amount of the first beverage ingredient is swirling. Such substantial amount could exceed 90 percent, and in most instances would be at least 85 percent of the total quantity. Thus, nearly all of the water is discharged into the cup before the syrup is admixed. Where fluid pressures are sufficiently high, it is possible that all of the water can be discharged before any of the syrup is added. In a typical embodiment, the timer 56 is provided with a cycle of about 10 seconds. The user deposits money to energize a credit mechanism and then presses a flavor-selection button which operates a switch that closes the correct combination of relays leading to the water and syrup valves 51—55 and starts the timer 56. The timer 56 has a circuit that erases the credit and substantially simultaneously vends a cup by actuating the cup-vending means 18.

Thereafter, for a typical period of about 5 seconds, carbonated water or noncarbonated water is discharged through the outlet means 22 into the cup and thereby caused to swirl. Thereafter, with possibly a slight overlap, the appropriate one of the syrup valves 53—55 is energized for a period of about 2.4 seconds to discharge the syrup or other second beverage ingredient onto the swirling water in the cup 17. Other apparatus may be employed to practice the hereindescribed method which involves the step of directing a sloping stream of a first beverage ingredient downwardly and horizontally into a serving cup, for example at an angle of 30°to 50°, and aimed at a point remote from the centerline of the cup, followed by the step of directing a second beverage ingredient downwardly into the cup onto the swirling first beverage ingredient, doing so when a substantial amount of the first beverage ingredient is in the cup and is swirling, such substantial amount being typically at least 85 percent of the total quantity of the first beverage ingredient to be dispensed.

In accordance with this method and apparatus, by having the syrup enter late in the dispensing cycle, decarbonation and hence foaming is minimized where carbonated water is used. Further, by this method and apparatus, there is provided uniform mixing without the disadvantage of employing heavy agitation and hence further inducing of foaming. By this invention, an extremely simple inexpensive structure is provided which has further advantages. In that the cup is permitted to drop substantially straight in a downward direction, the dropping time is predictable and reliable, a result that inherently also provides other advantages. The guide means required for such a drop can be simple, and the cup reliably stands erect for filling. The guide 19 extends between the path of the cup 17 while it is being dropped and the conduit means 22. Therefore, the legs 34a, 34a of the guide 19 are spaced a substantial distance apart as best seen in FIG. 1 so that the outlets of the conduit means may be directed therebetween. The opening provided by the guide rings 32, 33 and the guide legs 34a, 34a thus jointly comprise an aperture through which the first beverage ingredient is directed. In that the outlets to the conduit means 22 are outside of the cup 17, any dripping goes directly to the grille 28 and drip tray 29 in a sanitary manner, mere water creating no sanitation problem. The U-shaped portion 37 of the guide 19 is inverted as shown in FIG. 2 and its legs are likewise spaced apart to provide added clearance for the flow path of the second beverage ingredient from the outlets 23. As the outlet means 23 are disposed directly above the cup 17, any dripping therefrom falls directly into the cup 17. More over, in that the outlet means 23 is as close as possible to the edge of the cup 17 that is nearest to the door 26, a maximum period of time is afforded for any belated dripping to still fall into the cup 17 while the cup is being manually removed, thereby lessening the likelihood of the grille's 28 becoming unsanitary.

By this apparatus, a plurality of drinks can readily be dispensed from a single beverage mixing and dispensing machine 10. For instance, carbonated water and a cola syrup can provide a first mixed beverage. Carbonated water and orange syrup can provide a second mixed beverage. Noncarbonated water and orange syrup can provide a third mixed beverage. Further, in this embodiment, there is still another syrup that can be employed with either or both of the types of water to provide added beverage selection.

Although various minor modifications might be suggested by those versed in the art, it should be understood that we wish to embody within the scope of the patent warranted hereon all such embodiments as reasonably and properly come within the scope of our contribution to the art.

We claim as our invention:
1. A beverage mixing and dispensing machine, comprising:
   a. means for supporting a drinking cup at a predetermined upright position;
   b. means for vending the cup to said predetermined upright position;

c. conduit means arranged to be connected to a pressurized supply of a first liquid beverage ingredient, said conduit means having a sloping outlet directed to directly discharge said ingredient both downwardly and horizontally toward a point within the supported drinking cup radially remote from the center thereof for swirling the beverage ingredient in the cup about a vertical axis; and d. further means arranged to be connected to a supply of a second beverage ingredient, and having an outlet fixedly directed downwardly into the supported drinking cup adjacent to the edge thereof for discharging directly onto the swirling first beverage ingredient in the drinking cup.

2. A beverage mixing and dispensing machine, comprising:

a. means for supporting a cup at a predetermined position;

b. two conduits arranged to be respectively connected to two pressurized supplies of first liquid beverage ingredients of differing types, both of said conduits having a sloping outlet directed to discharge its ingredient both downwardly and horizontally toward a point within the supported cup radially remote from the center thereof for swirling the beverage ingredient in the cup about a vertical axis; and c. further means arranged to be connected to a supply of a second beverage ingredient, and having an outlet fixedly directed downwardly into the supported cup adjacent to the edge thereof for discharging onto the swirling first beverage ingredient, whereby a plurality of beverages may be mixed and dispensed.

3. A beverage mixing and dispensing machine according to claim 2, wherein said further means is arranged to be connected to a plurality of types of said second beverage ingredient, there being one said downwardly directed outlet for each of said plurality of types.

4. A beverage mixing and dispensing machine according to claim 1, wherein said sloping outlet slopes at an angle between 30° and 50° downwardly from the horizontal.

5. A beverage mixing and dispensing machine according to claim 2, wherein said sloping outlets terminate horizontally beyond the side of the predetermined position of the cup.

6. A beverage mixing and dispensing machine, comprising:

a. means for supporting a cup at a predetermined position;

b. conduit means arranged to be connected to a pressurized supply of a first liquid beverage ingredient, said conduit means having a sloping outlet directed to discharge said ingredient both downwardly and horizontally toward a point within the supported cup radially remote from the center thereof for swirling the beverage ingredient in the cup about a vertical axis, said sloping outlet terminating horizontally beyond the side of the predetermined position of the cup;

c. further means arranged to be connected to a supply of a second beverage ingredient, and having an outlet fixedly directed downwardly into the supported cup adjacent to the edge thereof for discharging onto the swirling first beverage ingredient;

d. means, aligned with said supporting means, for vending the cup into said predetermined position; and e. a cup-encircling guide disposed to receive a cup dropped by said cup-vending means, and to guide said cup to said predetermined position on said supporting means, said guide extending between the cup in said predetermined position and said sloping outlet, said guide being apertured in register with said outlet to enable said discharge therethrough.

7. A beverage mixing and dispensing machine according to claim 2, including:

a. control means for regulating flow through each of said outlets; and b. a timer connected to said control means for initiating flow of said second beverage ingredient while a substantial amount of one of said first beverage ingredients is swirling in the cup.

8. A beverage mixing and dispensing machine according to claim 7, wherein said timer is constructed to delay flow of said second beverage ingredient until at least 85 percent of said first beverage ingredient has been dispensed.

9. A beverage mixing and dispensing machine according to claim 2, including:

a. a cabinet having an apertured normally locked main door closing a sidewall thereof;

b. bracket means secured to said main door below said aperture and slidably supporting said cup-supporting means for movement in one horizontal direction away from said aperture; and c. a locking member carried by said bracket means for releasably holding said cup-supporting means on said bracket.

10. A beverage mixing and dispensing machine according to claim 9, wherein:

a. said cup-supporting means comprises a drip tray having a grille therein;

b. said bracket means comprises a flanged shelf slidably interlocked with said drip tray, and having an upstanding portion spaced from said main door; and c. said locking member comprises a bail pivoted on said bracket means in a vertical slot, and having a portion movable to a locked position between said upstanding bracket portion and said drip tray.

11. A beverage dispensing machine, comprising:

a. a cabinet having an apertured normally locked main door closing a sidewall thereof;

b. a flanged shelf secured to said main door adjacent to said aperture within said cabinet, said shelf having an upstanding portion at one side thereof and spaced from said main door;

c. a drip tray slidably interlocked with said flanged shelf, and having a grille for supporting a cup at a predetermined position to be filled; and d. a bail pivoted on said shelf in a vertical slot, and having a portion movable to a locked position between said upstanding portion and said drip tray to lock said drip tray between said bail and said main door to restrain said drip tray against sliding.

12. A method of mixing and dispensing a beverage by the cup, comprising:

a. vending a drinking cup to a position where it is supported with its axis vertical;

b. directing a pressurized sloping stream of a first liquid beverage ingredient through the atmosphere toward a point within the drinking cup that is radially remote from the center of the cup to effect swirling the beverage ingredient in the cup about a vertical axis; and c. directing a second beverage ingredient downwardly through the atmosphere into the cup adjacent to the edge thereof onto the swirling first beverage ingredient.

13. A method of mixing and dispensing a beverage according to claim 12, wherein the pressurized liquid stream is from a point radially outwardly of the cup and is directed at an angle between 30° and 50° downwardly from the horizontal.

14. A method of mixing and dispensing a beverage according to claim 12, wherein the flow of said second beverage ingredient is initiated while a substantial amount of said first beverage ingredient is swirling in the cup.

15. A method of mixing and dispensing a beverage according to claim 14, wherein at least 85 percent of said first beverage ingredient has been dispensed before said flow of said second beverage ingredient is initiated.

16. A beverage mixing and dispensing machine according to claim 2, which includes a cabinet having an aperture adjacent to said predetermined position, said outlet of said further means discharging into said cup at that portion thereof nearest to said cabinet aperture.

17. A beverage mixing and dispensing machine according to claim 2, including: a cup vending means and a cup-encircling guide disposed to receive a cup dropped by said cup-vending means, and to guide said cup to said predetermined position on said supporting means.